United States Patent
Wu et al.

(10) Patent No.: US 12,462,548 B2
(45) Date of Patent: Nov. 4, 2025

(54) NEURAL NETWORK SYSTEM AND SIGNAL PROCESSING METHOD

(71) Applicant: REALTEK SEMICONDUCTOR CORP., Hsinchu (TW)

(72) Inventors: Chih-Wei Wu, Hsinchu (TW); Chien-Hao Chen, Hsinchu (TW); Wei-Hsiang Shen, Hsinchu (TW); Shih-Tse Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 362 days.

(21) Appl. No.: 18/216,147

(22) Filed: Jun. 29, 2023

(65) Prior Publication Data
US 2024/0273887 A1    Aug. 15, 2024

(30) Foreign Application Priority Data
Feb. 2, 2023  (TW) .................................. 112103728

(51) Int. Cl.
*G06V 10/82* (2022.01)
*G06V 10/774* (2022.01)

(52) U.S. Cl.
CPC ............ *G06V 10/82* (2022.01); *G06V 10/774* (2022.01)

(58) Field of Classification Search
None
See application file for complete search history.

(56) References Cited

U.S. PATENT DOCUMENTS 12,313,727 B1 *  5/2025  Das ......................... G01S 7/417

OTHER PUBLICATIONS

Khan et al., "Transformers in Vision: A Survey", Jan. 19, 2022, pp. 1-30.
Woo et al., "CBAM: Convolutional Block Attention Module", Jul. 18, 2018, pp. 1-17.

* cited by examiner

*Primary Examiner* — Leon Flores
(74) *Attorney, Agent, or Firm* — Birch, Stewart, Kolasch & Birch, LLP (57) ABSTRACT

A neural network system and a signal processing method are provided. The neural network system includes at least one processing unit and a neural network module. The signal processing method includes: inputting a neural network input to the neural network module by the processing unit to generate an input at a previous layer of each convolutional transformer layer; performing pointwise convolution on the input by a key embedding layer based on key convolutional kernels to output a key tensor; performing convolution on the input by a value embedding layer based on value convolutional kernels to output a value tensor; performing a convolution on the cascading tensor of a first tensor and the key tensor by an attention embedding layer based on attention convolution kernels to output an attention tensor; and outputting an output tensor based on the attention tensor and the value tensor by an output module.

16 Claims, 8 Drawing Sheets

NEURAL NETWORK SYSTEM AND SIGNAL PROCESSING METHOD

CROSS-REFERENCE TO RELATED APPLICATION

This non-provisional application claims priority under 35 U.S.C. § 119(a) to Patent Application No. 112103728 filed in Taiwan, R.O.C. on Feb. 2, 2023, the entire contents of which are hereby incorporated by reference.

BACKGROUND

Technical Field

The present disclosure relates to the technical field of neural networks, and particularly relates to a technology for processing signal input by a layer of a neural network to generate output.

Related Art

A great success has been achieved in visual and voice processing with the assistance of an attention mechanism during using a deep learning related model. Particularly, with the appearance of a transformer architecture in recent years, there has been a leap in visual and voice application. Different from a traditional convolutional neural network (CNN) mechanism, the transformer is formed by stacking an encoder and a decoder, and global context information is considered by utilizing the attention mechanism, so that more useful features are obtained, and the output result of the deep learning model is improved under different scales. However, the model architecture of the transformer series has the problem of too many parameters, and the local information acquiring capability is lower than that of the convolutional neural network; if only the convolutional neural network architecture is used, the scale change capability is lower than that of the transformer, and the global context information cannot be considered, and as a result, the overall network performance is reduced.

SUMMARY

In view of this, some embodiments of the present disclosure provide a neural network system and a signal processing method, so as to ameliorate the existing technical problems.

Some embodiments of the present disclosure provide a neural network system. The neural network system includes at least one processing unit and a neural network module. The neural network module includes at least one convolutional transformer layer, and each of the at least one convolutional transformer layer is configured to receive an input and includes a key embedding layer configured to perform pointwise convolutional operation on the input based on a plurality of key convolutional kernels to output a key tensor; a value embedding layer configured to perform convolutional operation on the input based on a plurality of value convolutional kernels to output a value tensor, the size of the value convolutional kernels being larger than the size of the key convolutional kernels; an attention embedding layer configured to perform convolutional operation on a cascading tensor of the input and the key tensor based on a plurality of attention convolutional kernels to output an attention tensor, the number of channels of the attention tensor being the number of channels of the value tensor multiplied by a multiple; and an output module configured to output an output tensor based on the attention tensor and the value tensor. The at least one processing unit is configured to input the neural network input to the neural network module to generate an input at a previous layer of each of the at least one convolutional transformer layer.

Some embodiments of the present disclosure provide a signal processing method suitable for the above neural network system. The signal processing method includes the following steps: inputting a neural network input to a neural network module by at least one processing unit to generate an input at a previous layer of each of the at least one convolutional transformer layer; performing pointwise convolutional operation on the input by a key embedding layer based on a plurality of key convolutional kernels to output a key tensor; performing convolutional operation on the input by a value embedding layer based on a plurality of value convolutional kernels to output a value tensor, the size of the value convolutional kernels being larger than the size of the key convolutional kernels; performing a convolutional operation on the cascading tensor of the input and the key tensor by an attention embedding layer based on a plurality of attention convolution kernels to output an attention tensor, the number of channels of the attention tensor being the number of channels of the value tensor multiplied by a multiple; and outputting an output tensor by an output module based on the attention tensor and the value tensor.

Based on the above, some embodiments of the present disclosure provide a neural network system and a signal processing method. The input of the convolutional transformer layer respectively passes through the key embedding layer and the value embedding layer, and the key embedding layer can enhance the features of the input of the convolutional transformer layer. Moreover, the input of the convolutional transformer layer is locally explored by the value convolutional kernel with the larger size. An input cascading module and the attention embedding layer are configured to perform fusion on the input of the original convolutional transformer layer and the key tensor to generate the attention tensor. The number of channels of the attention tensor is set to be the number of value convolutional kernels multiplied by a multiple, thereby partitioning the attention tensor by the channels based on the attention tensor in the subsequent processing so as to obtain the feature tensors with the number being the above multiple. The output module combines the attention tensor and the value tensor, thereby obtaining a better feature tensor under a condition that a few parameters are added, and improving the resistance of multi-scale changes.

BRIEF DESCRIPTION OF THE DRAWINGS

FIG. 3-1 is a block diagram of an averaging and reshaping module drawn according to some embodiments of the present disclosure.

FIG. 3-2 is a schematic diagram of a reshaping flow drawn according to some embodiments of the present disclosure.

DETAILED DESCRIPTION

The above and other technical contents, features and functions of the present disclosure will be clearly presented in the following detailed description of the embodiments in conjunction with the reference drawings. Any modification or change not affecting the efficacy and purpose of the present disclosure shall still fall within the scope of the technical content provided in the present disclosure. The same numerals in all diagrams will be used to represent the same or similar elements. The term "connection" mentioned in the following embodiments can refer to any direct or indirect, wired or wireless connection means. In this specification, the "first" or "second" and other similar ordinal words described are used to distinguish or refer to being related to the same or similar elements or structures, and do not necessarily imply the order of these elements in the system. It is to be understood that in some cases or configurations, ordinal words can be used interchangeably without affecting the implementation of the present disclosure.

Figure 1:
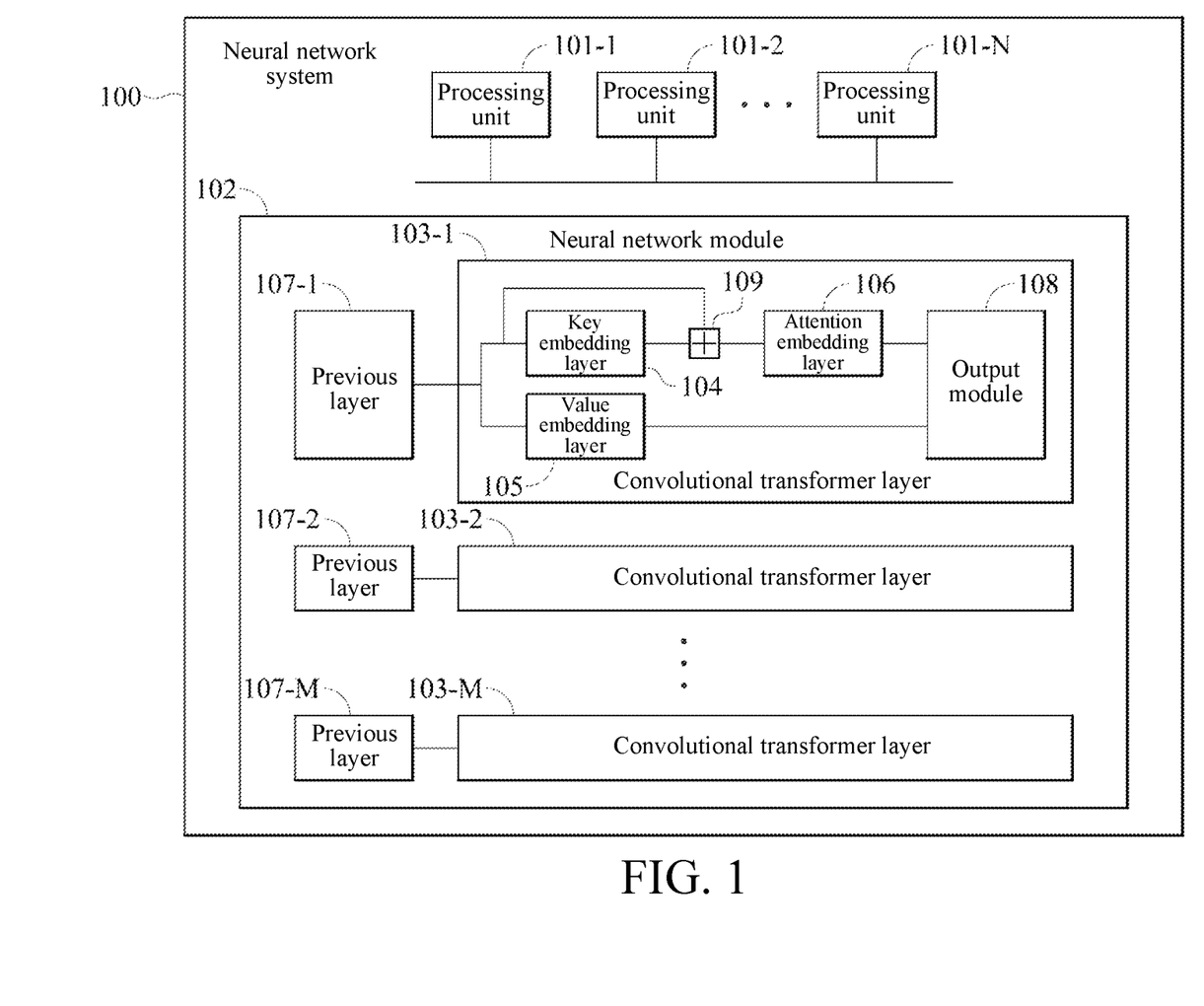
FIG. 1 is a block diagram of a neural network system drawn according to some embodiments of the present disclosure.

FIG. 1 is a block diagram of a neural network system drawn according to some embodiments of the present disclosure. Referring to FIG. 1, a neural network system 100 includes processing units 101-1 to 101-N and a neural network module 102, and N is a positive integer allowed to be 1. The neural network module 102 includes convolutional transformer layers 103-1 to 103-M, and M is a positive integer allowed to be 1. The convolutional transformer layers 103-1 to 103-M are connected with respective previous layers 107-1 to 107-M, and are configured to respectively receive the output of the previous layers 107-1 to 107-M as an input.

Each of the convolutional transformer layers 103-1 to 103-M includes a key embedding layer 104, a value embedding layer 105, an attention embedding layer 106, an input cascading module 109, and an output module 108. The key embedding layer 104 is provided with a plurality of key convolutional kernels having a dimension of $1\times1 \ldots \times1\times C$, C is the number of channels of the key convolutional kernels, and 1 is the size of the key convolutional kernels. After the key embedding layer 104 receives an input tensor, convolutional operation is performed on the input tensor based on the above key convolutional kernels. The operation of performing the convolutional operation on the tensor by the key convolutional kernels having the dimensions of $1\times1 \ldots \times1\times C$ is called pointwise convolutional operation. In some embodiments, the input tensor of the key embedding layer 104 is a 3-axis tensor having a dimension of $H\times W\times C$ (H is the dimension of a height axis, and W is the dimension of a width axis), so the dimensions of the key convolutional kernels are $1\times1\times C$. The key embedding layer 104 performs operation on the input tensor by the key convolutional kernels with the number being C', and performs concat on the tensors obtained by the operation of the input tensor by the key convolutional kernels with the number being C', so as to obtain an output tensor having a dimension of $H\times W\times C'$. The output tensor of the key embedding layer 104 is also called a key tensor. It should be noted that the input of the key embedding layer 104 can be a tensor having any dimension based on the same principle, and it is not limited in the present disclosure.

The value embedding layer 105 has a plurality of value convolutional kernels having a dimension of $P\times P \ldots \times P\times C$, C is the number of channels of the value convolutional kernels, and P is called the size of the value convolutional kernels. In the embodiment, P is a positive integer greater than 1, that is, the size of the value convolutional kernels is set to be greater than the size of key convolutional kernels. The output tensor of the value embedding layer 105 is called the value tensor. The attention embedding layer 106 has a plurality of attention convolutional kernels, and the number of the attention convolutional kernels is the number of the value convolutional kernels multiplied by a positive integer r. The output tensor of the attention embedding layer 106 is called the attention tensor. Since the number of the attention convolutional kernels is the number of the value convolutional kernels multiplied by r, the number of channels of the attention tensor is r multiplied by the number of channels of the value tensor.

Referring to FIG. 1 again, the input cascading module 109 is configured to receive two input tensors, and cascade the two received tensors based on the channels of the received input tensors. For example, the input cascading module 109 receives an input tensor having a dimension of $H_1\times W_1\times C_1$ ($H_1$ is the dimension of a height axis, $W_1$ is the dimension of a width axis, and $C_1$ is the number of channels of a channel axis) and an input tensor having a dimension of $H_1\times W_1\times C_2$ ($H_1$ is the dimension of a height axis, $W_1$ is the dimension of a width axis, and $C_2$ is the number of channels of a channel axis). The input cascading module 109 is configured to cascade the received input tensors based on the channels of the two received input tensors to obtain an output tensor with the number of channels of $C_1+C_2$.

A plurality of parameters of the key convolutional kernels, the value convolutional kernels and the attention convolutional kernels of the convolutional transformer layers 103-1 to 103-M are determined based on an updating algorithm and a training set in the training period of the neural network module 102. The above updating algorithm can be one of a gradient descent (GD) method, a stochastic gradient descent (SGD) method, a momentum method, an RMSProp method, an Adagrad method and an adaptive moment estimation (Adam) method, or other updating algorithms.

The output module 108 is configured to receive the attention tensor output by the attention embedding layer 106 and the value tensor output by the value embedding layer 105, and output an output tensor based on the attention tensor and the value tensor.

The signal processing method and cooperative operation of the modules of the neural network system 100 in some embodiments of the present disclosure are described in detail in combination with diagrams.

Figure 10:
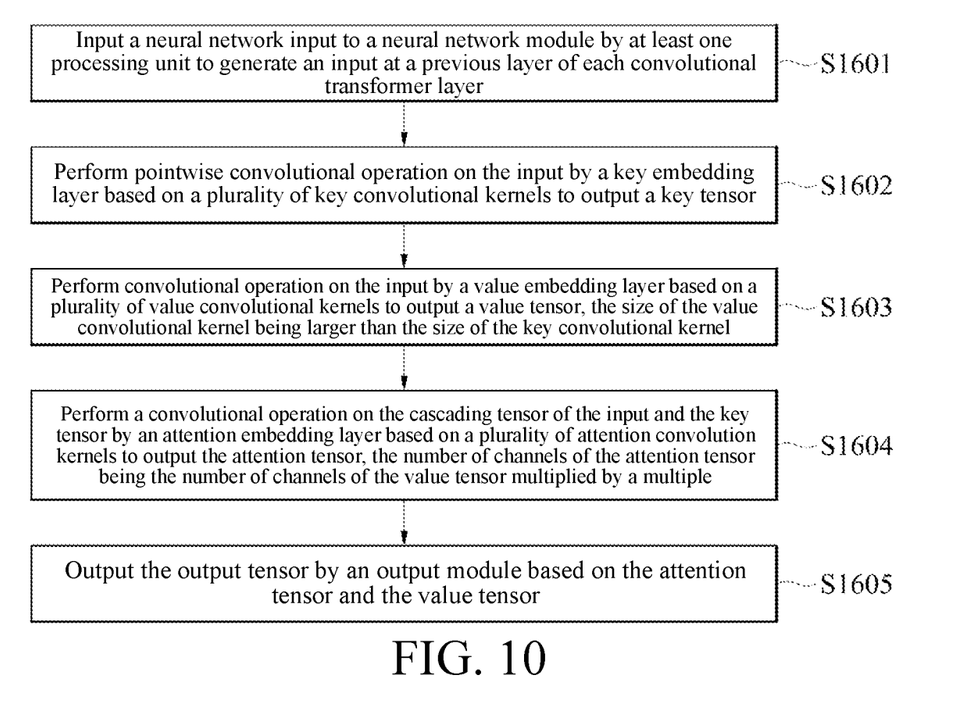
FIG. 10 is a flowchart of a signal processing method drawn according to some embodiments of the present disclosure.

FIG. 10 is a flowchart of a signal processing method drawn according to some embodiments of the present disclosure. Referring to FIG. 1 and FIG. 10 at the same time, in FIG. 10, the signal processing method includes steps S1601 to S1605. In step S1601, the processing units 101-1 to 101-N input a neural network input to the neural network module 102 to generate an output tensor at previous layers 107-1 to 107-M of the convolutional transformer layers 103-1 to 103-M as the input of each of the convolutional transformer layers 103-1 to 103-M. In the embodiment, the previous layers 107-1 to 107-M generate the output tensor with the number of channels being an even number. For convenient illustration, the convolutional transformer layer 103-1 is taken as an example for illustration, and the number of channels of the output tensor of the previous layer 107-1 of the convolutional transformer layer 103-1 is an even number denoted as ch.

In step S1602, the key embedding layer 104 performs a pointwise convolutional operation on the input based on a plurality of key convolutional kernels to output a key tensor. In the embodiment, the number of key convolutional kernels is set to half the number of channels of the input.

In step S1603, the value embedding layer 105 performs a convolutional operation on the input based on a plurality of value convolutional kernels to output a value tensor. In the embodiment, the number of value convolutional kernels is set to half the number of channels of the input.

In step S1604, the attention embedding layer 106 performs a convolutional operation on the cascading tensor of the input and the key tensor of the convolutional transformer layer 103-1 based on a plurality of attention convolutional kernels to output an attention tensor, and the input cascading module 109 is configured to cascade the input and the key tensor of the convolutional transformer layer 103-1 based on the channel of the input and the key tensor to obtain the cascading tensor of the input and the key tensor of the convolutional transformer layer 103-1. As described above, the number of the attention convolutional kernels is the number of value convolutional kernels multiplied by a multiple r, so the number of channels of the attention tensor is $$r \cdot \frac{ch}{2}.$$

In step S1605, the output module 108 outputs the output tensor of the convolutional transformer layer 103-1 based on the attention tensor and the value tensor.

It should be noted that the dimension of each key convolutional kernel is 1×1 ... ×1×C, so the output tensor of the key embedding layer 104 is the result of linear combination of each channel in the input tensor, and the coefficient of the above linear combination is the parameter of the key convolutional kernel. The operation of linear combination on each channel in the input tensor of the key embedding layer 104 can achieve the exchange of information between channels, thereby enhancing the features of the input tensor. Moreover, the number of channels of the input tensor of the key embedding layer 104 can be transformed from C to C' by setting the number of key convolutional kernels. If C'<C (for example, in the above embodiment, ch is transformed to $$\frac{ch}{2}),$$

the above operation of linear combination on each channel in the input tensor of the key embedding layer 104 is actually to compress the original data. During the training of the above neural network module 102, the coefficients of the above linear combination (namely, the parameters of the above key convolutional kernel) can be used to learn the training set based on the updating algorithm, so as to achieve the purpose of compressing and enhancing the features of the input tensor.

In FIG. 10, the input of the convolutional transformer layer 103-1 respectively passes through the key embedding layer 104 and the value embedding layer 105, and the key embedding layer 104 can enhance the features of the input of the convolutional transformer layer 103-1. Moreover, the input of the convolutional transformer layer 103-1 is locally explored by the value convolutional kernel with the larger size. According to the embodiment in FIG. 10, the input cascading module 109 and the attention embedding layer 106 are configured to perform fusion on the input and the key tensor of the original convolutional transformer layer 103-1 to generate the attention tensor. The number of channels of the attention tensor is set to be the number of value convolutional kernels multiplied by a multiple r, thereby partitioning the attention tensor by the channels based on the attention tensor in subsequent processing so as to obtain r important feature tensors. The output module 108 combines the attention tensor and the value tensor, thereby obtaining a better feature tensor under a condition that a few parameters are added, and improving the resistance of multi-scale changes.

It should be noted that the number of channels of the key tensor and the value tensor can also be set to other numbers according to requirements, for example, the number of channels of the key tensor and the value tensor is set to $$\frac{ch}{4}.$$

Alternatively, the number of channels of the key tensor is set to $$\frac{3ch}{4},$$

and the number of channels of the value tensor is set $$\frac{ch}{4}.$$

In some embodiments of the present disclosure, the output tensor of the previous layers 107-1 to 107-M is a 3-axis tensor, and the above multiple r is the square of the size of the above plurality of value convolutional kernels.

Figure 2:
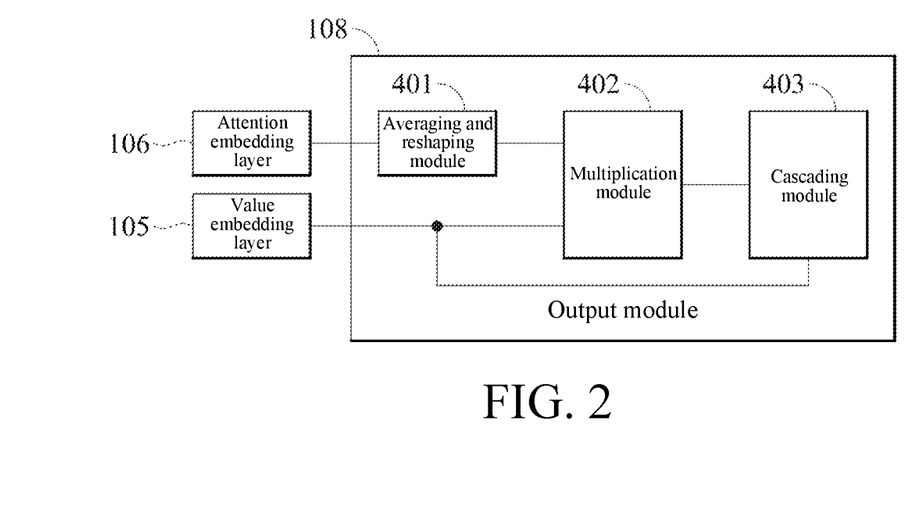
FIG. 2 is a block diagram of an output module drawn according to some embodiments of the present disclosure.
Figure 11:
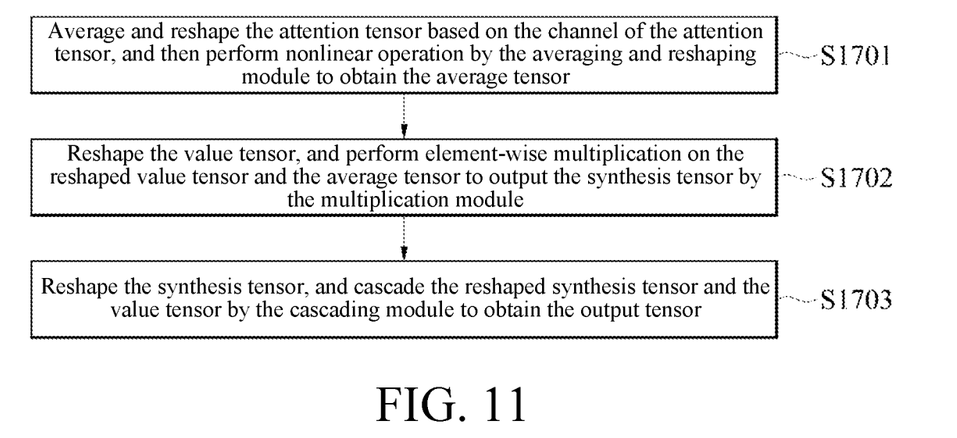
FIG. 11 is a flowchart of an output drawn according to some embodiments of the present disclosure.

FIG. 2 is a block diagram of an output module drawn according to some embodiments of the present disclosure. FIG. 11 is a flowchart of an output drawn according to some embodiments of the present disclosure. Referring to FIG. 2 and FIG. 11 at the same time, the convolutional transformer layer 103-1 is taken as an example for illustration. The output module 108 includes an averaging and reshaping module 401, a multiplication module 402, and a cascading module 403. The averaging and reshaping module 401 is configured to receive an attention tensor outputted by the attention embedding layer 106, average and reshape the above attention tensor based on the channel of the attention tensor, and then perform the nonlinear operation to obtain an average tensor. The multiplication module 402 is configured to receive the above average tensor and a value tensor outputted by the value embedding layer 105, and reshape the value tensor to enable the dimension of the reshaped value tensor to be matched with the average tensor, thereby performing the element-wise multiplication operation on the reshaped value tensor and the average tensor. The multiplication module 402 is configured to perform the element-wise multiplication operation on the reshaped value tensor and the average tensor to output a synthesis tensor. The cascading module 403 is configured to receive the synthesis tensor and the value tensor outputted by the value embedding layer 105, and reshape the synthesis tensor to enable the reshaped synthesis tensor to be in cascading with the value tensor. The cascading module 403 is configured to cascade the reshaped synthesis tensor and the value tensor to obtain an output tensor of the convolutional transformer layer 103-1.

In FIG. 11, the above step S1605 includes steps S1701-S1703. In step S1701, the averaging and reshaping module 401 averages and reshapes the attention tensor based on the channel of the attention tensor, and then performs nonlinear operation to obtain the average tensor. In step S1702, the multiplication module 402 reshapes the value tensor, and performs element-wise multiplication operation on the reshaped value tensor and the average tensor to output the synthesis tensor. In step S1703, the cascading module 403 reshapes the synthesis tensor, and cascades the reshaped synthesis tensor and the value tensor to obtain the output tensor.

Figure 12:
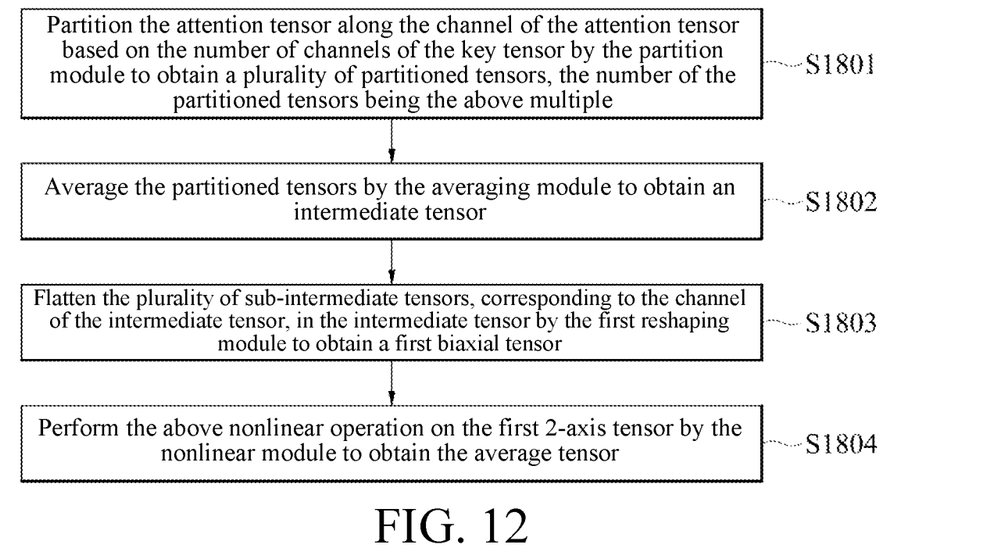
FIG. 12 is a flowchart of averaging and reshaping drawn according to some embodiments of the present disclosure.
Figure 31:
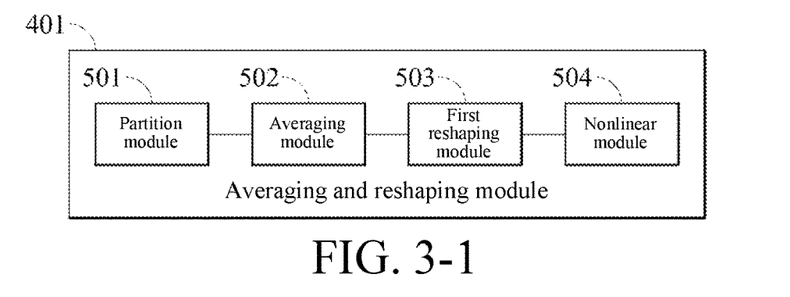
Figure 32:
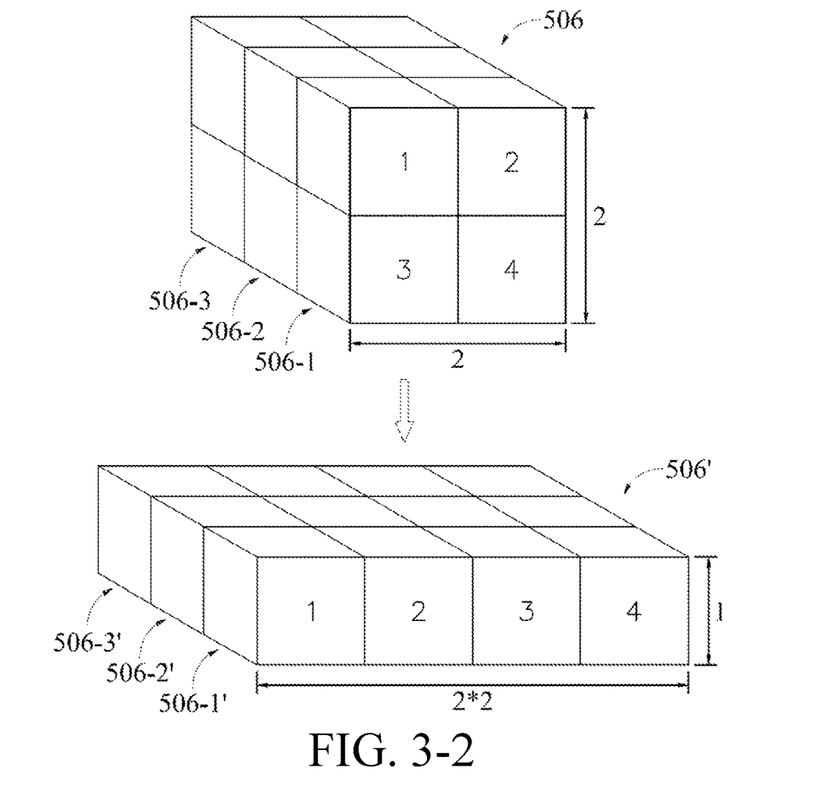

FIG. 3-1 is a block diagram of an averaging and reshaping module drawn according to some embodiments of the present disclosure. FIG. 3-2 is a schematic diagram of a reshaping flow drawn according to some embodiments of the present disclosure. FIG. 12 is a flowchart of averaging and reshaping drawn according to some embodiments of the present disclosure. Referring to FIG. 3-1 to 3-2 and FIG. 12 at the same time, the averaging and reshaping module 401 includes a partition module 501, an averaging module 502, a first reshaping module 503 and a nonlinear module 504.

The partition module 501 is configured to receive the attention tensor and partition the attention tensor along the channels of the attention tensor based on the number of channels of the value tensor to obtain a plurality of partition tensors with the number being the above multiple r. In some embodiments, the number of channels of the attention tensor is r m, and m is the number of value convolutional kernels and is also the number of channels of the value tensor. The partition module 501 is configured to partition the attention tensor along the channels of the attention tensor to obtain r partition tensors with the number of channels being m.

The averaging module 502 is configured to average the partition tensors to obtain an intermediate tensor. The above "averaging" means element-wise averaging, i.e., elements at the same position in the partition tensors are averaged. The first reshaping module 503 is configured to flatten a plurality of sub-intermediate tensors, corresponding to the channel of the intermediate tensor, in the above intermediate tensor, so as to obtain a first 2-axis tensor. FIG. 3-2 shows an example for illustration on operation of the first reshaping module.

The intermediate tensor 506 is a 3-axis tensor having a dimension of 2×2×3. The sub-intermediate tensors 506-1 to 506-3 are a plurality of sub-intermediate tensors corresponding to the channel of the intermediate tensor 506 in the intermediate tensor 506 and having a dimension of 2×2×1, and the sub-intermediate tensor 506-1 includes elements 1, 2, 3 and 4. The first reshaping module 503 is configured to flatten the sub-intermediate tensor 506-1 into a tensor 506-1' having a dimension of (2*2)×1 according to a specific sequence (as shown by the arrangement of elements 1, 2, 3 and 4). The first reshaping module 503 is configured to flatten the sub-intermediate tensors 506-2 and 506-3 into tensors 506-2' and 506-3' according to the above specific sequence to obtain a first 2-axis tensor 506' having a dimension of (2*2)×3.

The nonlinear module 504 is configured to receive the above first 2-axis tensor, and perform nonlinear operation (for example, the operation of sigmoid function for each element) of the first 2-axis tensor to obtain an average tensor.

In FIG. 12, the step S1701 includes steps S1801 to S1804. In step S1801, the partition module 501 partitions the attention tensor along the channel of the attention tensor based on the number of channels of the key tensor to obtain a plurality of partitioned tensors with the number being a multiple r. In step S1802, the averaging module 502 averages the partitioned tensors to obtain an intermediate tensor. In step S1803, the first reshaping module 503 flattens the plurality of sub-intermediate tensors, corresponding to the channel of the intermediate tensor, in the intermediate tensor to obtain the first 2-axis tensor. In step S1804, the nonlinear module 504 performs the nonlinear operation on the first 2-axis tensor to obtain the average tensor. By the averaging of the partitioned tensors, the average information of the partitioned tensors can be found, thereby avoiding an abnormal value.

Figure 4:
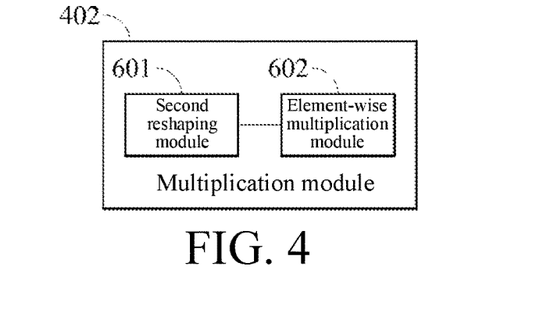
FIG. 4 is a block diagram of a multiplication module drawn according to some embodiments of the present disclosure.
Figure 13:
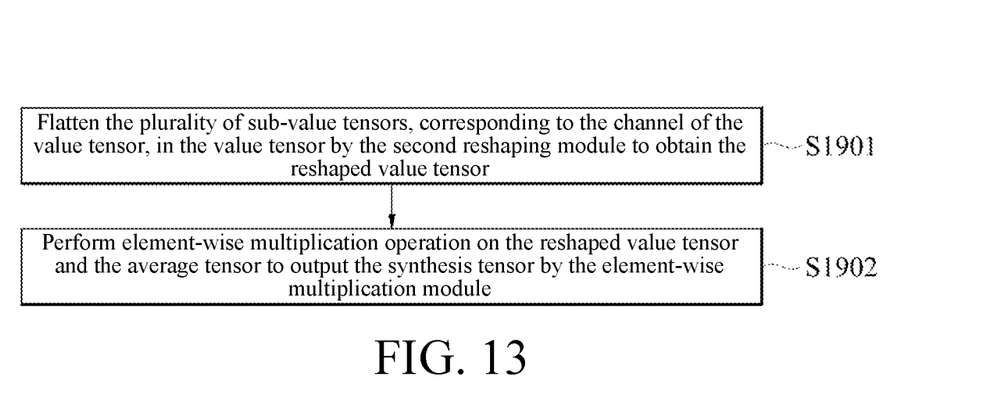
FIG. 13 is a flowchart of multiplication operation drawn according to some embodiments of the present disclosure.

FIG. 4 is a block diagram of a multiplication module drawn according to some embodiments of the present disclosure. FIG. 13 is a flowchart of multiplication operation drawn according to some embodiments of the present disclosure. As shown in FIG. 4 and FIG. 13, the multiplication module 402 includes a second reshaping module 601 and an element-wise multiplication module 602. The second reshaping module 601 is configured to flatten a plurality of sub-value tensors, corresponding to the channel of the value tensor, in the value tensors to obtain the reshaped value tensor, and the operation is the same as that of the first reshaping module 503.

The element-wise multiplication module 602 is configured to perform element-wise multiplication operation (namely, multiplication of elements under the same positions of two tensors) on the reshaped value tensor and the average tensor so as to output the synthesis tensor.

In FIG. 13, the above step S1702 includes steps S1901 to S1902. In step S1901, the second reshaping module 601 flattens the plurality of sub-value tensors, corresponding to the channel of the value tensor, in the value tensor to obtain the reshaped value tensor. In step S1902, the element-wise multiplication module 602 performs element-wise multiplication operation on the reshaped value tensor and the average tensor to output the synthesis tensor.

Figures 5, 6:
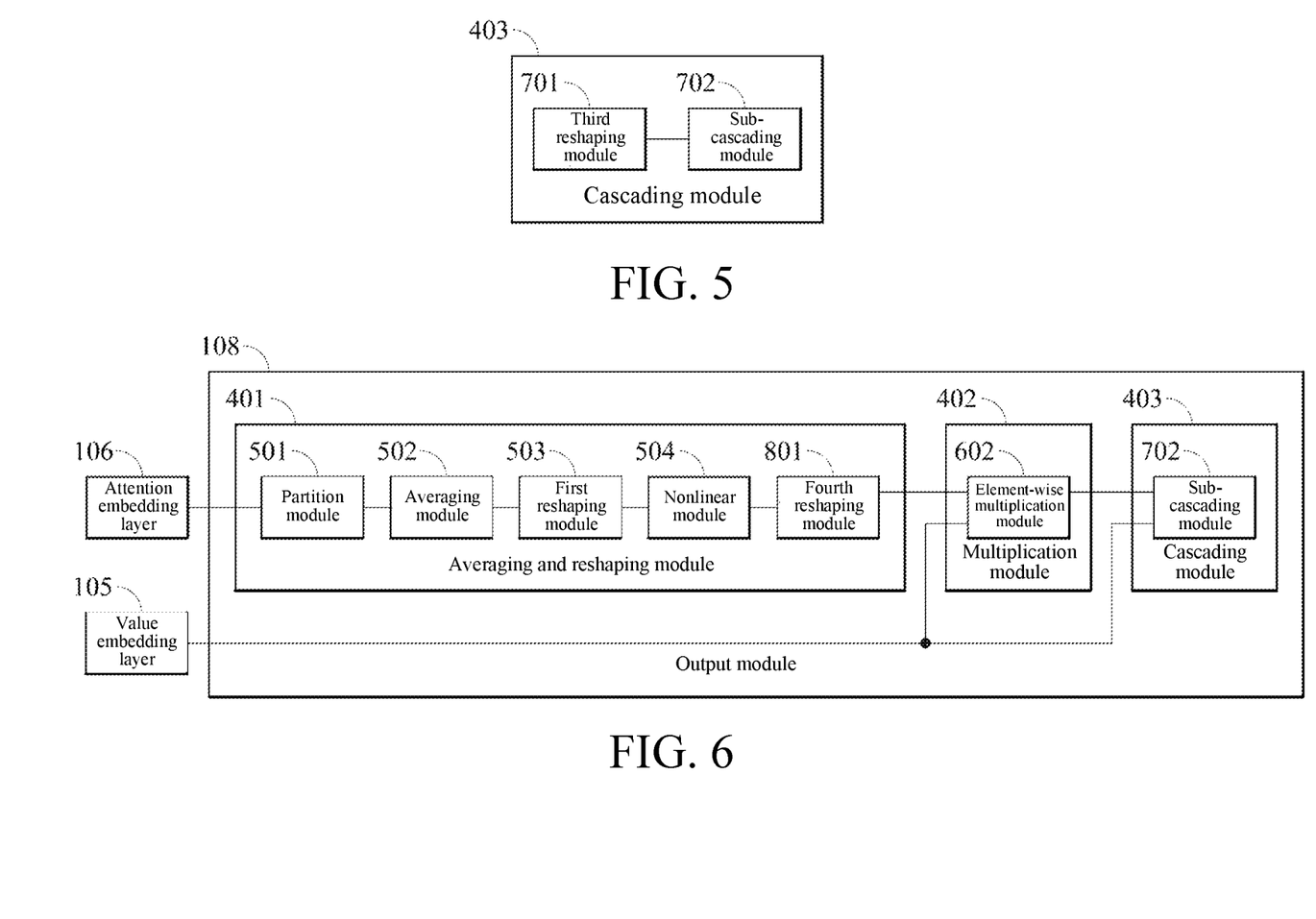
FIG. 5 is a block diagram of a cascading module drawn according to some embodiments of the present disclosure.
FIG. 6 is a block diagram of an output module drawn according to some embodiments of the present disclosure.
Figure 14:
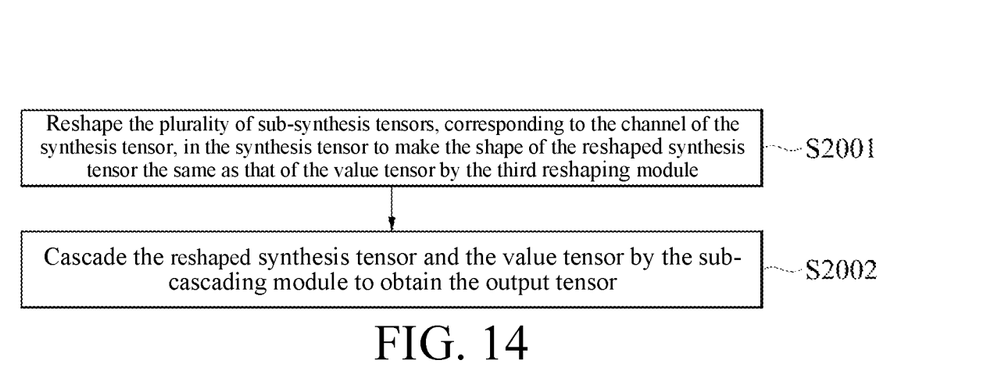
FIG. 14 is a flowchart of cascading operation drawn according to some embodiments of the present disclosure.

FIG. 5 is a block diagram of a cascading module drawn according to some embodiments of the present disclosure. FIG. 14 is a flowchart of cascading operation drawn according to some embodiments of the present disclosure. Referring to FIG. 5 and FIG. 14 at the same time, the cascading module 403 includes a third reshaping module 701 and a sub-cascading module 702. The third reshaping module 701 is configured to reshape a plurality of sub-synthesis tensors, corresponding to the channel of the synthesis tensor, in the synthesis tensor to make the shape of the reshaped synthesis tensor the same as that of the value tensor (for example, reshaping the synthesis tensor in a reverse sequence of a specific sequence adopted by the second reshaping module 601). The sub-cascading module 702 is configured to cascade the reshaped synthesis tensor and the value tensor based on the channel of the reshaped synthesis tensor and the value tensor to obtain an output tensor.

In FIG. 14, the step S1703 includes steps S2001 to S2002. In step S2001, the third reshaping module 701 reshapes the plurality of sub-synthesis tensors, corresponding to the channel of the synthesis tensor, in the synthesis tensor to make the shape of the reshaped synthesis tensor the same as that of the value tensor; and in step S2002, the sub-cascading module 702 cascades the reshaped synthesis tensor and the value tensor to obtain the output tensor.

FIG. 6 is a block diagram of an output module drawn according to some embodiments of the present disclosure. In FIG. 6, compared with the above embodiments, the averaging and reshaping module 401 mostly includes a fourth reshaping module 801. The fourth reshaping module 801 is configured to reshape the average tensor to enable the reshaped average tensor to be matched with the value tensor in shape (for example, reshaping the average tensor in a reverse sequence of a specific sequence adopted by the first reshaping module 503), so as to perform element-wise multiplication operation on the reshaped average tensor and the value tensor. The average tensor is reshaped to be matched with the value tensor in shape by the fourth reshaping module 801, the multiplication module 402 does not include a second reshaping module 601, and the multiplication module 402 is configured to directly perform element-wise multiplication operation on the reshaped average tensor and the value tensor by the element-wise multiplication module 602 to output the synthesis tensor the same as the value tensor in shape. The synthesis tensor and the value tensor are the same in shape, and the cascading module 403 does not include a third reshaping module 701, so the cascading module 403 is configured to directly cascade the synthesis tensor and the value tensor to obtain an output tensor.

Figure 7:
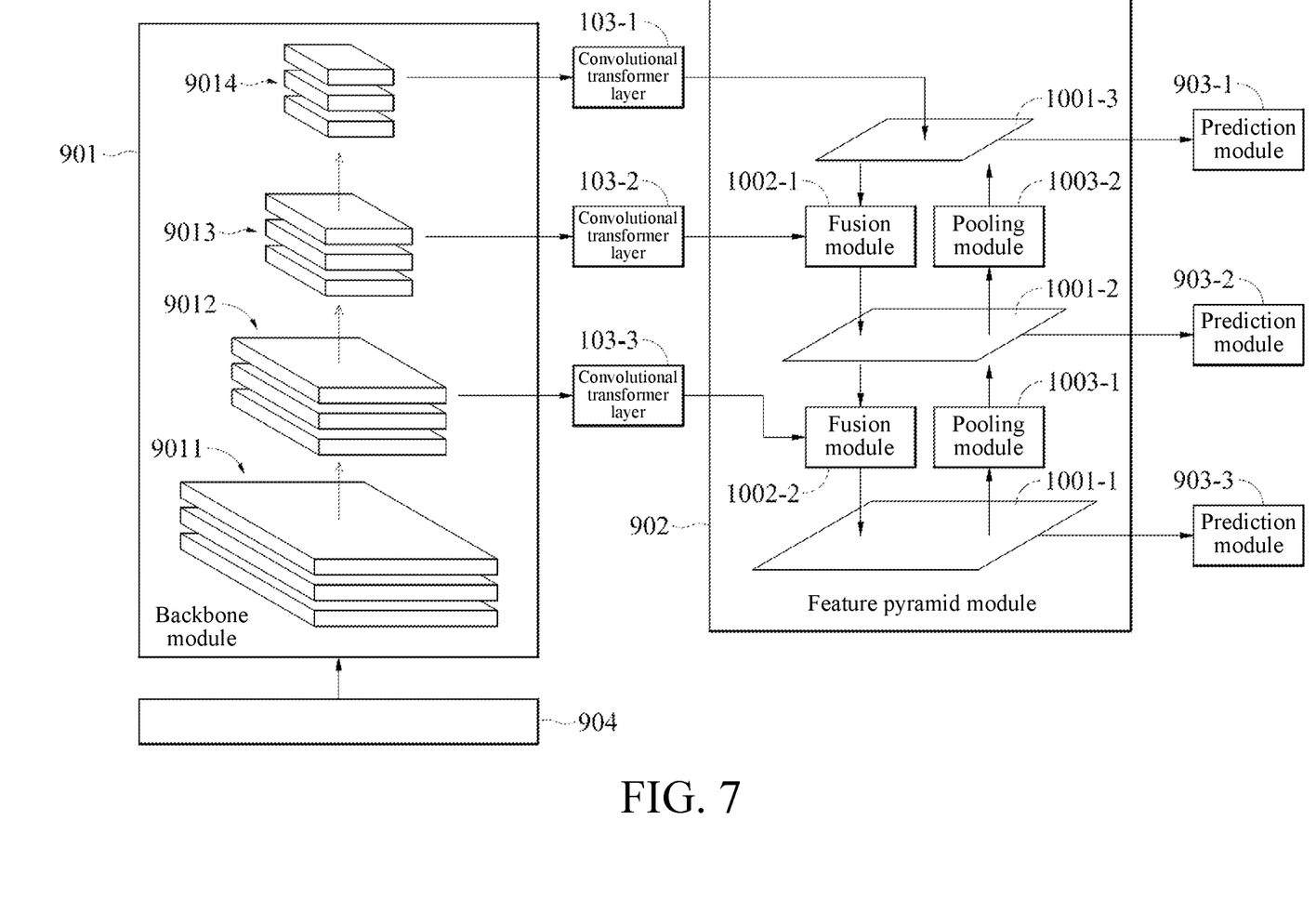
FIG. 7 is a block diagram of a neural network module drawn according to some embodiments of the present disclosure.

FIG. 7 is a block diagram of a neural network module drawn according to some embodiments of the present disclosure. Referring to FIG. 7, the neural network module 102 includes a backbone module 901, convolutional transformer layers 103-1 to 103-M, a feature pyramid module 902 and prediction modules 903-1 to 903-M. M=3 is taken as an example for illustration as follows. The above neural network input is an image tensor 904 including an object.

In the embodiments, the convolutional transformer layers 103-1 to 103-3 do not change the input dimension.

The backbone module 901 includes backbone layers 9011 to 9014 having different sizes, and the backbone module 901 is configured to generate a plurality of feature tensors having different sizes based on the image tensor 904 by the backbone layers 9011 to 9014. Each of the convolutional transformer layers 103-1 to 103-3 is configured to receive one of the above plurality of feature tensors to generate a plurality of intermediate feature tensors having different sizes. It should be noted that other number of backbone layers can be provided, or the backbone layers can be connected in series and in parallel at the same time.

In some embodiments of the present disclosure, each of the backbone layers 9011 to 9014 includes a convolution layer to generate the above plurality of feature tensors.

The feature pyramid module 902 is configured to perform feature fusion on the above plurality of intermediate feature tensors to obtain a plurality of output feature tensors. Each of the prediction modules 903-1 to 903-M is configured to receive one of the above output feature tensors to generate position information and category information of the above object. The position information of the above object includes coordinates of one vertex of a rectangular frame where the above object is located and the side length of the rectangular frame. The above category information includes the probability that the above object belongs to one category.

In the embodiment, the above step S1601 includes: obtaining a plurality of feature tensors having different sizes by the backbone module 901 by backbone layers 9011 to 9014 based on the image tensor 904, each of the convolutional transformer layers 103-1 to 103-3 being configured to respectively receive one of the feature tensors as an input. In the embodiment, the signal processing method further includes the following first and second steps; and in the first step, the feature pyramid module 902 performs the feature fusion on the plurality of intermediate feature tensors having different sizes generated by the convolutional transformer layers 103-1 to 103-3 to obtain a plurality of output feature tensors. In the second step, each of the prediction modules 903-1 to 903-M receives one of the output feature tensors to generate the position information and category information of the object.

Figure 8:
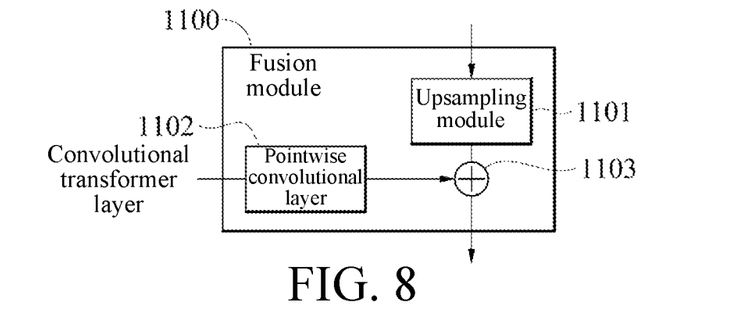
FIG. 8 is a block diagram of a fusion module drawn according to some embodiments of the present disclosure.

FIG. 8 is a block diagram of a fusion module drawn according to some embodiments of the present disclosure. Referring to FIG. 7 and FIG. 8 at the same time, in some embodiments of the present disclosure, the feature pyramid module 902 includes fusion modules 1002-1 to 1002-(M−1) and pooling modules 1003-1 to 1003-(M−1), and M=3 is taken as an example for illustration as follows.

In the embodiment, the structure of the fusion modules 1002-1 to 1002-2 is shown by the fusion module 1100, and the fusion module 1100 includes an upsampling module 1101, a pointwise convolution layer 1102, and a pointwise addition module 1103. The operation of the pointwise convolution layer 1102 is performed as described above. The upsampling module 1101 is configured to repeat the element K times in the height axis and width axis directions of the tensor to transform the size of the input tensor of the upsampling module 1101 into K times of the original size, and K depends on the transforming demands. The upsampling module 1101 also can employ other upsampling methods. The pointwise addition module 1103 is configured to perform pointwise addition operation on two received input tensors to obtain an output tensor of the pointwise addition module 1103.

The feature pyramid module 902 is configured to set the intermediate feature tensor outputted by the convolutional transformer layer 103-1 as a temporary feature tensor 1001-3, and fuse the temporary feature tensor 1001-3 and the intermediate feature tensor outputted by the convolutional transformer layer 103-2 by the fusion module 1002-1 to obtain a temporary feature tensor 1001-2. The feature pyramid module 902 is configured to fuse the temporary feature tensor 1001-2 and the intermediate feature tensor outputted by the convolutional transformer layer 103-3 by the fusion module 1002-2 to obtain a temporary feature tensor 1001-1. After the temporary feature tensors 1001-1 to 1001-3 are obtained, the feature pyramid module 902 is configured to perform pooling operation on the temporary feature tensor 1001-1 by the pooling module 1003-1, and add the pooled temporary feature tensor 1001-1 and the temporary feature tensor 1001-2 to update the temporary feature tensor 1001-2.

Then, the feature pyramid module 902 is configured to perform pooling operation on the updated temporary feature tensor 1001-2 by the pooling module 1003-2, and add the pooled temporary feature tensor 1001-2 and the temporary feature tensor 1001-3 to update the temporary feature tensor 1001-3. In the above process, the plurality of intermediate feature tensors having different sizes generated by the convolutional transformer layers 103-1 to 103-3 can be fully fused. The feature pyramid module 902 is configured to output the temporary feature tensor 1001-1 and the updated temporary feature tensors 1001-2 to 1001-3 to prediction modules 903-1 to 903-3 respectively to determine the position information of the object.

It should be noted that the feature pyramid module 902 can be of other structures, for example, the feature pyramid module 902 does not contain the pooling modules 1003-1 to 1003-(M−1). The feature pyramid module 902 is configured to fuse the plurality of intermediate feature tensors having different sizes by the fusion modules 1002-1 to 1002-2, that is, the temporary feature tensors 1001-1 to 1001-3 are used as the output feature tensors.

It should be noted that the prediction modules 903-1 to 903-3 are sometimes called network heads, and those with ordinary knowledge in the technical art of the present disclosure can refer to the design of other network heads to realize a prediction module structure.

In the embodiment drawn in FIG. 7, the above convolutional transformer layers 103-1 to 103-3 are configured to process a plurality of feature tensors having different sizes generated by the feature pyramid module 902, so that the overall performance of the neural network can be improved.

Figure 9:
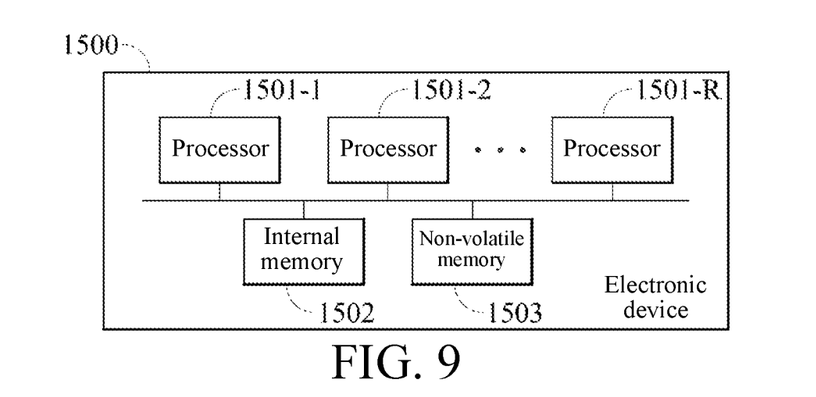
FIG. 9 is a schematic structural diagram of an electronic device drawn according to some embodiments of the present disclosure.

FIG. 9 is a schematic diagram of an electronic device drawn according to some embodiments of the present disclosure. As shown in FIG. 9, on a hardware level, the electronic device 1500 includes processors 1501-1 to 1501-R, an internal memory 1502 and a non-volatile memory 1503, and R is a positive integer. The internal memory 1502 is a random access memory for example. The non-volatile memory is at least 1 disk memory and the like for example. The processing units 101-1 to 101-N can be realized by the processors 1501-1 to 1501-R.

The internal memory 1502 and the non-volatile memory 1503 are configured to store programs, the programs can include program codes, and the program codes include computer operation instructions. The processors 1501-1 to 1501-R read the corresponding computer programs from the non-volatile memory 1503 to the internal memory 1502 and then run the programs for executing steps recorded in FIG. 10 to FIG. 14. The above neural network module 102 can be stored in the internal memory 1502 and the non-volatile memory 1503 in a software form, and can also be implemented in a hardware form.

An embodiments of the present disclosure furthermore provides a computer-readable storage medium. The computer-readable storage medium stores at least one instruction. When the at least one instruction is executed by the processor of the electronic device, the processor can execute the methods and the steps disclosed in the above embodiments.

Examples of storage media of a computer include, but are not limited to, a phase change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other internal memory technologies, a compact disc read-only memory (CD-ROM), a digital versatile disc (DVD) or other optical memories, other magnetic storage devices or any other non-transmission media, and can be configured to store information allowed to be accessed by a computing device. Computer readable media do not include transitory media, such as modulated data signals and carriers.

Some embodiments of the present disclosure provide a neural network system and a signal processing method, by combining the attention tensor and the value tensor inputted by the corresponding convolutional transformer layer, a better feature tensor can be obtained under the condition that a few parameters are added, and the resistance of multi-scale change is improved.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. A neural network system, comprising at least one processing unit and a neural network module, wherein the neural network module comprises at least one convolutional transformer layer, and each of the at least one convolutional transformer layer is configured to receive an input and comprises: a key embedding layer configured to perform pointwise convolutional operation on the input based on a plurality of key convolutional kernels to output a key tensor; a value embedding layer configured to perform convolutional operation on the input based on a plurality of value convolutional kernels to output a value tensor, the size of the value convolutional kernels being larger than the size of the key convolutional kernels; an attention embedding layer configured to perform convolutional operation on a cascading tensor of the input and the key tensor based on a plurality of attention convolutional kernels to output an attention tensor, the number of channels of the attention tensor being the number of channels of the value tensor multiplied by a multiple; and an output module configured to output an output tensor based on the attention tensor and the value tensor, and the at least one processing unit is configured to input a neural network input to the neural network module to generate the input at a previous layer of each of the at least one convolutional transformer layer; wherein the output module comprises: an averaging and reshaping module configured to average and reshape the attention tensor based on a channel of the attention tensor, and then perform nonlinear operation to obtain an average tensor; a multiplication module configured to reshape the value tensor, and perform element-wise multiplication operation on the reshaped value tensor and the average tensor to output a synthesis tensor; and a cascading module configured to reshape the synthesis tensor, and cascade the reshaped synthesis tensor and the value tensor to obtain the output tensor.

2. The neural network system according to claim 1, wherein a plurality of parameters of the key convolutional kernels, the value convolutional kernels and the attention convolutional kernels are determined based on an updating algorithm and a training set in a training period of the neural network module.

3. The neural network system according to claim 1, wherein the input is a 3-axis tensor, and the multiple is the square of the size of the value convolutional kernels.

4. The neural network system according to claim 1, wherein the size of the value convolutional kernels is 3.

5. The neural network system according to claim 1, wherein the averaging and reshaping module comprises:
   a partition module configured to partition the attention tensor along the channel of the attention tensor based on the number of channels of the value tensor to obtain a plurality of partitioned tensors, the number of the partitioned tensors being the multiple;
   an averaging module configured to average the partitioned tensors to obtain an intermediate tensor;
   a first reshaping module configured to flatten a plurality of sub-intermediate tensors, corresponding to a channel of the intermediate tensor, in the intermediate tensor to obtain a first 2-axis tensor; and
   a nonlinear module configured to perform the nonlinear operation on the first 2-axis tensor to obtain the average tensor.

6. The neural network system according to claim 5, wherein the multiplication module comprises:
   a second reshaping module configured to flatten a plurality of sub-value tensors, corresponding to the channel of the value tensor, in the value tensor to obtain the reshaped value tensor; and
   an element-wise multiplication module configured to perform the element-wise multiplication operation on the reshaped value tensor and the average tensor to output the synthesis tensor.

7. The neural network system according to claim 6, wherein the cascading module comprises:
   a third reshaping module configured to reshape the plurality of sub-synthesis tensors, corresponding to the channel of the synthesis tensor, in the synthesis tensor to make the shape of the reshaped synthesis tensor the same as that of the value tensor; and
   a sub-cascading module configured to cascade the reshaped synthesis tensor and the value tensor to obtain the output tensor.

8. The neural network system according to claim 1, wherein the neural network input is an image tensor comprising an object; and the neural network module comprises:
   a backbone module comprising a plurality of backbone layers having different sizes and being configured to generate a plurality of feature tensors having different sizes based on the image tensor by the backbone layers, each of the at least one convolutional transformer layer being configured to receive one of the feature tensors to generate a plurality of intermediate feature tensors having different sizes;
   a feature pyramid module configured to perform feature fusion on the intermediate feature tensors to obtain a plurality of output feature tensors; and
   a plurality of prediction modules, each of the prediction modules being configured to receive one of the output feature tensors to generate position information and category information of the object.

9. A signal processing method, being suitable for a neural network system comprising at least one processing unit and a neural network module, the neural network module comprising at least one convolutional transformer layer, each of the at least one convolutional transformer layer comprising a key embedding layer, a value embedding layer, an attention embedding layer and an output module, the signal processing method comprising following steps: (a) inputting a neural network input to the neural network module by the at least one processing unit to generate an input at a previous layer of each of the at least one convolutional transformer layer; (b) performing pointwise convolutional operation on the input by the key embedding layer based on a plurality of key convolutional kernels to output a key tensor; (c) performing convolutional operation on the input by the value embedding layer based on a plurality of value convolutional kernels to output a value tensor, the size of the value convolutional kernels being larger than the size of the key convolutional kernels; (d) performing a convolutional operation on a cascading tensor of the input and the key tensor by the attention embedding layer based on a plurality of attention convolution kernels to output an attention tensor, the number of channels of the attention tensor being the number of channels of the value tensor multiplied by a multiple; and (e) outputting an output tensor by the output module based on the attention tensor and the value tensor; wherein the output module comprises an averaging and reshaping module, a multiplication module and a cascading module, and the above step (e) comprises: (e1) averaging and reshaping the attention tensor based on a channel of the attention tensor, and then performing nonlinear operation by the averaging and reshaping module to obtain an average tensor; (e2) reshaping the value tensor, and performing element-wise multiplication operation on the reshaped value tensor and the average tensor to output a synthesis tensor by the multiplication module; and (e3) reshaping the synthesis tensor, and cascading the reshaped synthesis tensor and the value tensor by the cascading module to obtain the output tensor.

10. The signal processing method according to claim 9, wherein a plurality of parameters of the key convolutional kernels, the value convolutional kernels and the attention convolutional kernels are determined based on an updating algorithm and a training set in the training period of the neural network module.

11. The signal processing method according to claim 9, wherein the input is a 3-axis tensor, and the multiple is the square of the size of the value convolutional kernels.

12. The signal processing method according to claim 9, wherein the size of the value convolutional kernels is 3.

13. The signal processing method according to claim 9, wherein the averaging and reshaping module comprises a partition module, an averaging module, a first reshaping module and a nonlinear module, and the above step (e1) comprises:
   (e11) partitioning the attention tensor along the channel of the attention tensor based on the number of channels of the value tensor by the partition module to obtain a plurality of partitioned tensors, the number of the partitioned tensors being the multiple;
   (e12) averaging the partitioned tensors by the averaging module to obtain an intermediate tensor;
   (e13) flattening a plurality of sub-intermediate tensors, corresponding to a channel of the intermediate tensor, in the intermediate tensor by the first reshaping module to obtain a first 2-axis tensor; and
   (e14) performing the nonlinear operation on the first 2-axis tensor by the nonlinear module to obtain the average tensor.

14. The signal processing method according to claim 13, wherein the multiplication module comprises a second reshaping module and an element-wise multiplication module, and the above step (e2) comprises:
   (e21) flattening a plurality of sub-value tensors, corresponding to a channel of the value tensor, in the value tensor by the second reshaping module to obtain the reshaped value tensor; and (e22) performing the element-wise multiplication operation on the reshaped value tensor and the average tensor to output the synthesis tensor by the element-wise multiplication module.

15. The signal processing method according to claim 14, wherein the reshaping and cascading module comprises a third reshaping module and a sub-cascading module, and the above step (e3) comprises:
- (e31) reshaping a plurality of sub-synthesis tensors, corresponding to a channel of the synthesis tensor, in the synthesis tensor to make the shape of the reshaped synthesis tensor the same as that of the value tensor by the third reshaping module; and
- (e32) cascading the reshaped synthesis tensor and the value tensor by the sub-cascading module to obtain the output tensor.

16. The signal processing method according to claim 9, wherein the neural network input is an image tensor comprising an object; and the neural network module comprises a backbone module comprising a plurality of backbone layers having different sizes, a feature pyramid module and a plurality of prediction modules; and the above step (a) comprises: generating a plurality of feature tensors having different sizes by the backbone module based on the image tensor by the backbone layers, each of the at least one convolutional transformer layer respectively receiving one of the feature tensors as the input, and the signal processing method comprises the following steps:
- (f) performing the feature fusion on the plurality of intermediate feature tensors having different sizes generated by the at least one convolutional transformer layers by the feature pyramid module to obtain a plurality of output feature tensors; and
- (g) receiving one of the output feature tensors by each of the prediction modules to generate position information and category information of the object.

* * * * *